(12) United States Patent
Yamamoto et al.

(10) Patent No.: US 8,130,310 B2
(45) Date of Patent: Mar. 6, 2012

(54) IMAGE PICKUP APPARATUS

(75) Inventors: Kenji Yamamoto, Kanagawa (JP);
Shigeatsu Yoshioka, Kanagawa (JP);
Isao Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 547 days.

(21) Appl. No.: 12/213,413

(22) Filed: Jun. 19, 2008

(65) Prior Publication Data

US 2009/0027542 A1    Jan. 29, 2009

(30) Foreign Application Priority Data

Jul. 13, 2007   (JP) ................................. 2007-184211

(51) Int. Cl.
*H04N 5/235* (2006.01)
*H04N 5/225* (2006.01)
*H04N 5/232* (2006.01)
*G03B 7/00* (2006.01)
*G03B 13/00* (2006.01)

(52) U.S. Cl. .......................... 348/362; 348/340; 348/345

(58) Field of Classification Search ............... 348/208.1, 348/221.1, 362–363, 340, 208.12, 222.1
See application file for complete search history.

(56) References Cited

U.S. PATENT DOCUMENTS

| | | | | |
|---|---|---|---|---|
| 5,727,242 A * | 3/1998 | Lo et al. | | 396/324 |
| 6,046,466 A * | 4/2000 | Ishida et al. | | 257/258 |
| 6,178,046 B1 * | 1/2001 | Broome et al. | | 359/618 |
| 6,639,629 B1 * | 10/2003 | Takayama et al. | | 348/364 |
| 6,787,824 B2 * | 9/2004 | Takeuchi et al. | | 257/258 |
| 6,977,686 B2 * | 12/2005 | Shinomiya et al. | | 348/340 |
| 7,372,497 B2 * | 5/2008 | Weng et al. | | 348/340 |
| 7,405,761 B2 * | 7/2008 | Feldman et al. | | 348/340 |
| 7,936,392 B2 * | 5/2011 | Ng et al. | | 348/349 |
| 2002/0121652 A1 * | 9/2002 | Yamasaki | | 257/222 |
| 2007/0230944 A1 * | 10/2007 | Georgiev | | 396/322 |
| 2009/0140131 A1 * | 6/2009 | Utagawa | | 250/226 |
| 2010/0026852 A1 * | 2/2010 | Ng et al. | | 348/239 |

FOREIGN PATENT DOCUMENTS

| | | |
|---|---|---|
| JP | 2002-320128 A | 10/2002 |
| JP | 2005-031460 A | 2/2005 |
| WO | WO 2006/039486 A2 | 4/2006 |

OTHER PUBLICATIONS

Ng et al., "Light Field Photography with a Hand-held Plenoptic Camera", Stanford Tech Report CTSR Feb. 2005, pp. 1-11.
Japanese Office Action issued Aug. 23, 2011 for corresponding Japanese Applcation No. 2007-184211.

* cited by examiner

*Primary Examiner* — Nhan T Tran
*Assistant Examiner* — Tuan Le
(74) *Attorney, Agent, or Firm* — Rader, Fishman & Grauer PLLC

(57) ABSTRACT

An image pickup apparatus capable of increasing the number of pixels in a reproduced image without a decline in image quality of a picked up image is provided. The image pickup apparatus includes: an image pickup lens section including an aperture stop, the aperture stop including a plurality of aperture sections; an image pickup device obtaining image pickup data on the basis of light received; and a microlens array section being arranged on the focal plane of the image pickup lens section between the image pickup lens and the image pickup device, and including one microlens for a plurality of pixels of the image pickup device.

12 Claims, 15 Drawing Sheets

▨ P10

P1

IMAGE PICKUP APPARATUS

CROSS REFERENCES TO RELATED APPLICATIONS

The present invention contains subject matter related to Japanese Patent Application JP 2007-184211 filed in the Japanese Patent Office on Jul. 13, 2007, the entire contents of which are incorporated herein by reference.

BACKGROUND OF THE INVENTION

1. Field of the Invention

The present invention relates to an image pickup apparatus using a microlens array.

2. Description of the Related Art

Various image pickup apparatuses have been proposed and developed in the past. Moreover, an image pickup apparatus performing predetermined image processing on image pickup data obtained by picking up an image to output the image pickup data has been proposed.

For example, in International Patent Publication No. 06/039486 and Ren.Ng, et al. "Light Field Photography with a Hand-Held Plenoptic Camera", Stanford Tech Report CTSR 2005-02, an image pickup apparatus using a technique called "Light Field Photography" is proposed. The image pickup apparatus includes an image pickup lens, a microlens array, an image pickup device and an image processing section, and an aperture stop including a single aperture in its central part is included in the image pickup lens. By such a configuration, image pickup data obtained by the image pickup device include the intensity distribution of light on a light-sensing plane as well as information about the traveling direction of the light. Then, the image processing section is capable of reproducing an image viewed from an arbitrary viewpoint or an arbitrary direction (hereinafter, simply referred to as a field of view).

SUMMARY OF THE INVENTION

In the above-described microlens array, a plurality of microlenses are arranged, and a plurality of pixels of the image pickup device are associated with each microlens. In the case where the above-described technique is used, the number of pixels in a reproduced image is equal to the number of microlenses in the microlens array. It is because information about the two-dimensional coordinates of the reproduced image is determined by the coordinates of the microlens array. Therefore, the number of pixels in the two-dimensional coordinates of the reproduced image is equal to the number determined by dividing the total number of pixels of the image pickup device by the number of pixels associated with each microlens. On the other hand, the number of pixels associated with each microlens is equal to the resolution of the angular information of a light ray and determines the resolution in an arbitrary field of view of the reproduced image, that is, it determines the number of viewpoints or directions from which an image is reproduced. Therefore, there is a trade-off relationship between the resolution in an arbitrary field of view and the number of pixels in two-dimensional coordinates.

Therefore, in the case where the total number of pixels of the image pickup device is fixed, when the number of microlenses is increased, the number of pixels associated with each microlens in the image pickup device is reduced, and thereby it becomes possible to increase the number of pixels in the two-dimensional coordinates of the reproduced image.

However, in the case where the number of pixels associated with each microlens is reduced, the resolution in the traveling direction of a light ray received by each pixel is reduced, and thereby it is difficult to obtain information about a light ray in a desired traveling direction. Therefore, when the reproduced image is formed by image processing, the image quality of the reproduced image declines.

In view of the foregoing, it is desirable to provide an image pickup apparatus which obtains image pickup data and is capable of increasing the number of pixels without a decline in the image quality of a reproduced image when forming the reproduced image by image processing.

According to an embodiment of the invention, there is provided an image pickup apparatus including: an image pickup lens section including an aperture stop, the aperture stop including a plurality of aperture sections; an image pickup device obtaining image pickup data on the basis of light received; and a microlens array section being arranged on the focal plane of the image pickup lens section between the image pickup lens and the image pickup device, and including one microlens for a plurality of pixels of the image pickup device.

In the image pickup apparatus according to the embodiment of the invention, an image of an object to be picked up by the image pickup lens section is formed on the microlens array section. Then, a light ray entering into the microlens array section reaches the image pickup device, and is received by a plurality of pixels corresponding to each microlens, and thereby image pickup data including information about the traveling direction of light is obtained. In this case, the aperture stop of the above-described image pickup lens section includes a plurality of aperture sections, thereby a luminous flux is narrowed by each aperture section, and in the image pickup device, light is received in a pixel region corresponding to each aperture section. Therefore, even in the case where the number of microlenses increased to reduce the number of pixels of the image pickup device associated with each microlens, a luminous flux is narrowed by the aperture section in one pixel, and only a light ray of which the traveling direction is limited passes through the aperture section, so compared to a related art in which a single aperture section is arranged in an aperture stop of an image pickup lens, information about a light ray in a desired traveling direction is obtained easily.

In the image pickup apparatus according to the embodiment of the invention, the aperture stop of the image pickup lens includes a plurality of aperture sections, so even in the case where the number of microlenses increases to reduce the number of pixels associated with each microlens, in the image pickup device, a luminous flux is narrowed by each aperture section to be received, so in a light-sensing region in one pixel, information about a light ray in a desired traveling direction is obtained easily. Therefore, when image processing is performed to obtain a reproduced image, it becomes possible to increase the number of pixels in the reproduced image without a decline in image quality.

Other and further objects, features and advantages of the invention will appear more fully from the following description.

DETAILED DESCRIPTION OF THE PREFERRED EMBODIMENTS

A preferred embodiment will be described in detail below referring to the accompanying drawings.

Figure 1:
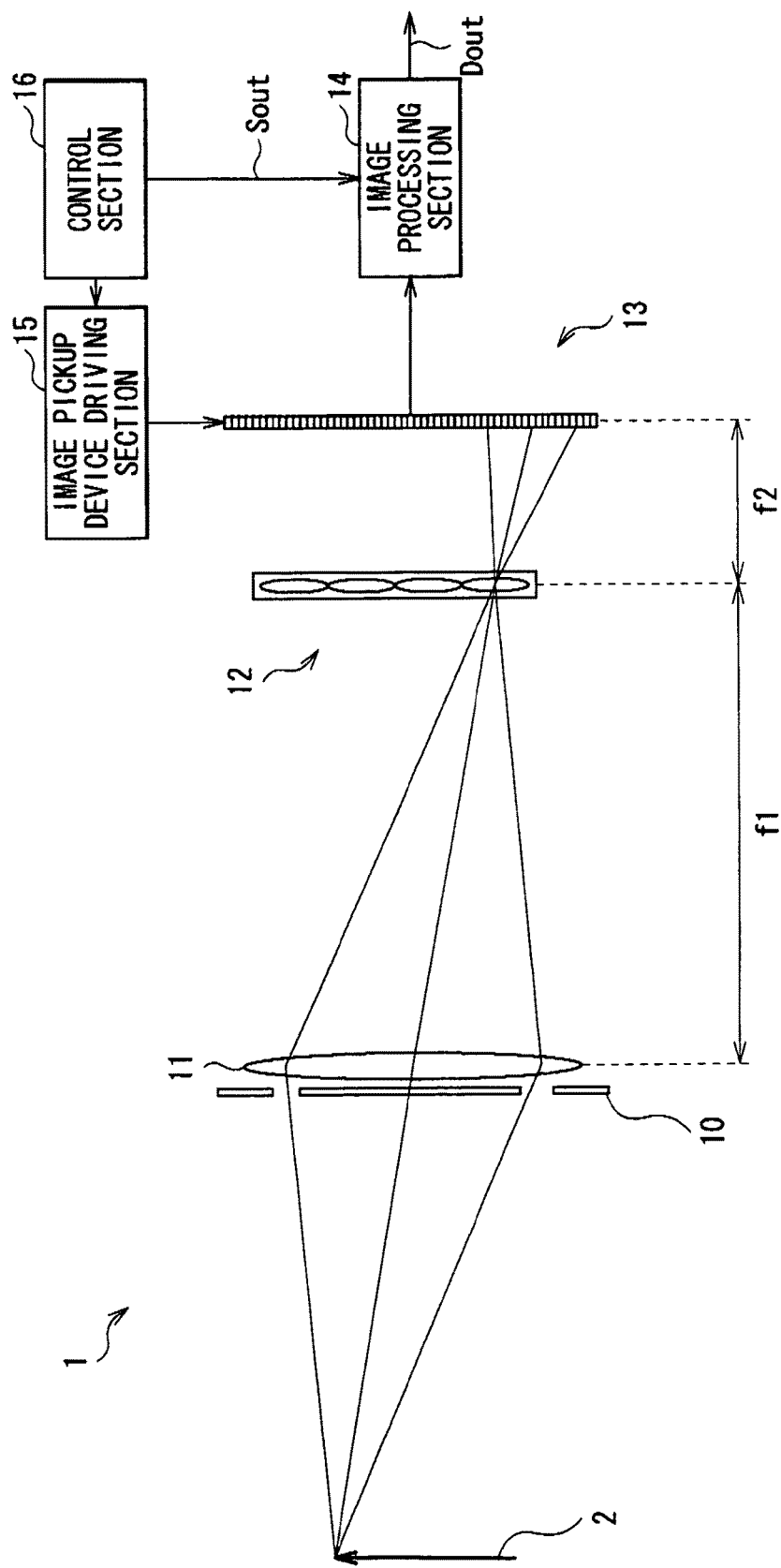
FIG. 1 is an illustration showing the whole configuration of an image pickup apparatus according to a first embodiment of the invention.

FIG. 1 shows the whole configuration of an image pickup apparatus (an image pickup apparatus 1) according to a first embodiment of the invention. The image pickup apparatus 1 picks up an image of an object 2 to output image pickup data Dout, and includes an aperture stop 10, an image pickup lens 11, a microlens array 12, an image pickup device 13, an image processing section 14, an image pickup device driving section 15 and a control section 16 in order from a side closer to the object 2.

The aperture stop 10 is an optical aperture stop of the image pickup lens 11. The specific configuration of the aperture stop 10 will be described later.

The image pickup lens 11 is a main lens for picking up an image of an object, and includes, for example, a typical image pickup lens used in a video camera, a still camera or the like.

In the microlens array 12, a plurality of microlenses, which will be described later, are arranged, and the microlens array 12 is arranged on the focal plane of the image pickup lens 11 (a reference numeral f1 in the drawing indicates the focal length of the image pickup lens 11). The specific configuration of the microlens array 12 will be described later.

The image pickup device 13 receives light from the microlens array 12 to obtain image pickup data, and is arranged on the focal plane of the microlens array 12 (a reference numeral f2 in the drawing indicates the focal length of the microlens array 12). The image pickup device 13 includes a two-dimensional image pickup device, such as a plurality of CCDs (Charge Coupled Devices) or a plurality of CMOSs (Complementary Metal-Oxide Semiconductors), arranged in a matrix form, or the like.

On a light-sensing plane (a plane closer to the microlens array 12) of such an image pickup device 13, a M×N (M and N each are an integer) number of image pickup pixels (pixels P) are arranged in a matrix form, and a plurality of pixels P are associated with one microlens in the microlens array 12. The number of pixels P on the light-sensing plane is, for example, M×N=3720×2520=9374400. The number (m×n) of pixels associated with each microlens is related to the resolution in an arbitrary field of view of a reproduced image, so the resolution in the arbitrary field of view of the reproduced image increases with an increase in the values of m and n. On the other hand, the values of (M/m) and (N/n) are related to the number of pixels (the resolution) in the reproduced image, so the number of pixels in the reproduced image increases with an increase in the values of (M/m) and (N/n). Therefore, there is a trade-off relationship between the resolution in the arbitrary field of view of the reproduced image and the number of pixels.

The image processing section 14 performs predetermined image processing on the image pickup data obtained by the image pickup device 13, and outputs the image pickup data as image pickup data Dout. More specifically, for example, arithmetic processing using a technique called "Light Field Photography" is performed, and thereby it becomes possible to reproduce an image in an arbitrary field of view.

The image pickup device driving section 15 drives the image pickup device 13 and controls the light-sensing operation of the image pickup device 13.

The control section 16 controls the operations of the image processing section 14 and the image pickup device driving section 15, and includes, for example, a microcomputer or the like.

Figure 2:
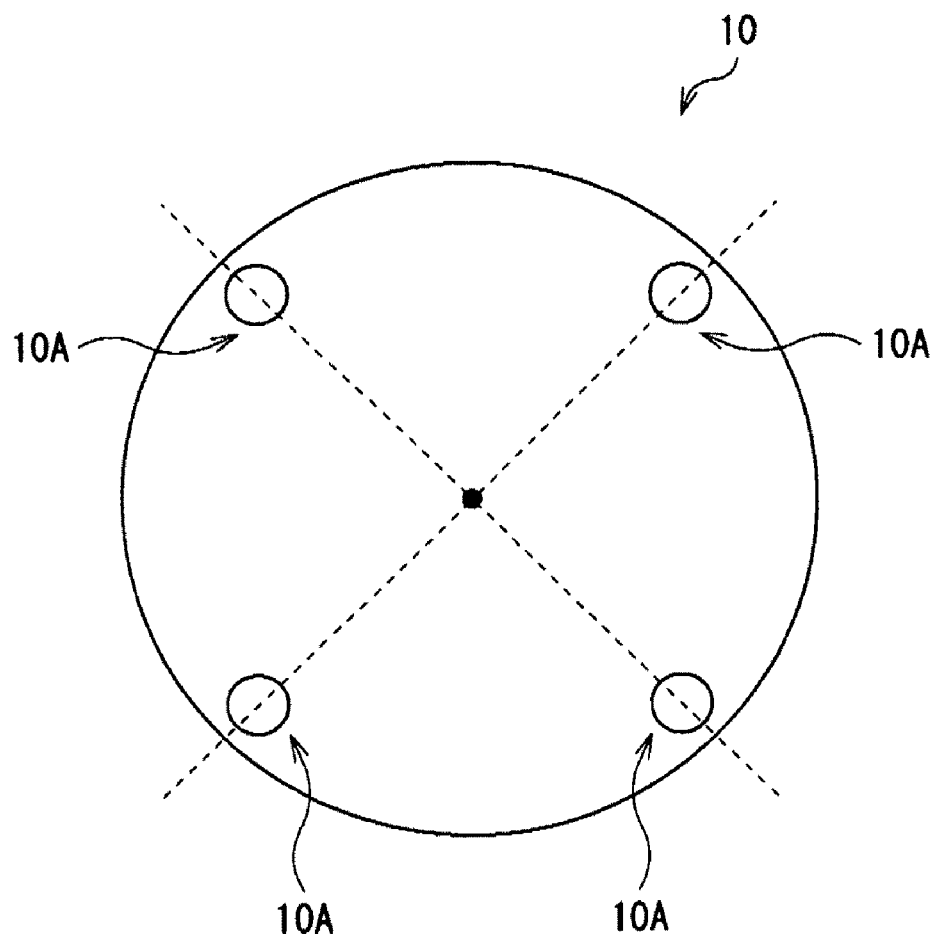
FIG. 2 is a schematic plan view showing an aperture stop shown in FIG. 1.

Next, referring to FIG. 2, the specific configuration of the aperture stop 10 will be described below. FIG. 2 shows a schematic plan view of the aperture stop 10.

The aperture stop 10 has, for example, a circular shape, and includes four aperture sections 10A. The aperture sections 10A are arranged, for example, along the circumference of the aperture stop 10 (in a region on a circumference side) so as to be rotation-symmetrical with respect to each other about the center point of the aperture stop 10. The shapes of the aperture sections 10A are not specifically limited; however, the sizes of the aperture sections 10A are preferably small. This is because the smaller the size is, the more easily the traveling direction of a light ray is extracted. Moreover, the number of the aperture sections 10A is preferably equal to the number of pixels associated with each microlens in the image pickup device 13 (in the embodiment, the number is 4).

Figure 3A:
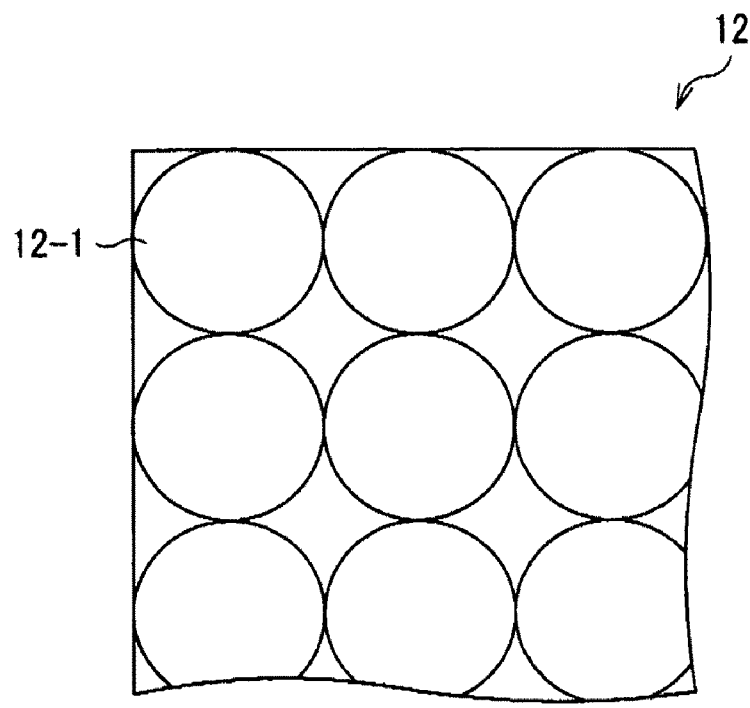
FIGS. 3A and 3B are schematic plan views showing a microlens array.
Figure 3B:
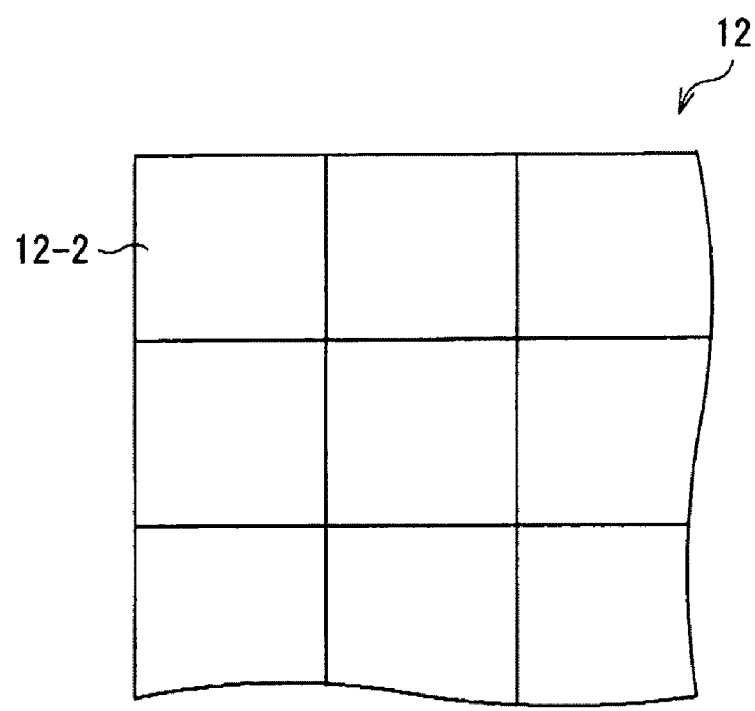

Next, referring to FIGS. 3A and 3B, the specific configuration of the microlens array 12 will be described below. FIGS. 3A and 3B show plan views of the microlens array 12.

As shown in FIG. 3A, in the microlens array 12, a plurality of microlenses 12-1 are two-dimensionally arranged in a matrix form. The planar shapes of the microlenses 12-1 are circular. Alternatively, as shown in FIG. 3B, square-shaped microlenses 12-2 may be two-dimensionally arranged. Moreover, such microlenses 12-1 and 12-2 are made of, for example, liquid crystal lenses, liquid lenses, diffractive lenses and the like.

Further, 2×2=4 pixels P (four pixels P) of the image pickup device 13 are associated with one microlens, and are the resolution in an arbitrary field of view in the embodiment, so an image in four fields of view in total is able to be obtained.

On the other hand, the microlens array 12 includes a number of microlenses determined by dividing the number of pixels of the whole image pickup device 13 by four, and the number of microlenses is the number of pixels in the reproduced image in the embodiment. In the following description, a circular microlens array shown in FIG. 3A, which is two-dimensionally arranged, is used as the microlens array 12.

Figure 10:
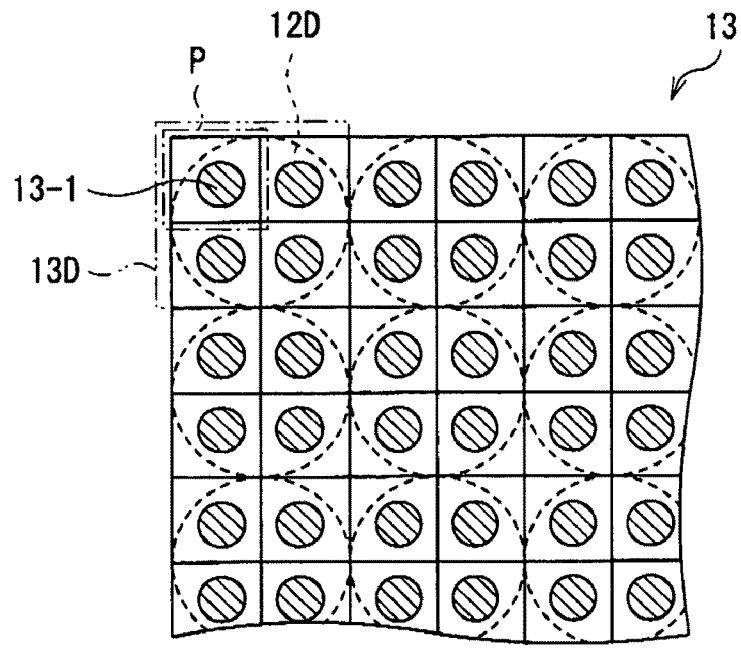
FIG. 10 is an illustration showing a light-sensing region on an image pickup device according to an embodiment of the invention.
Figure 11:
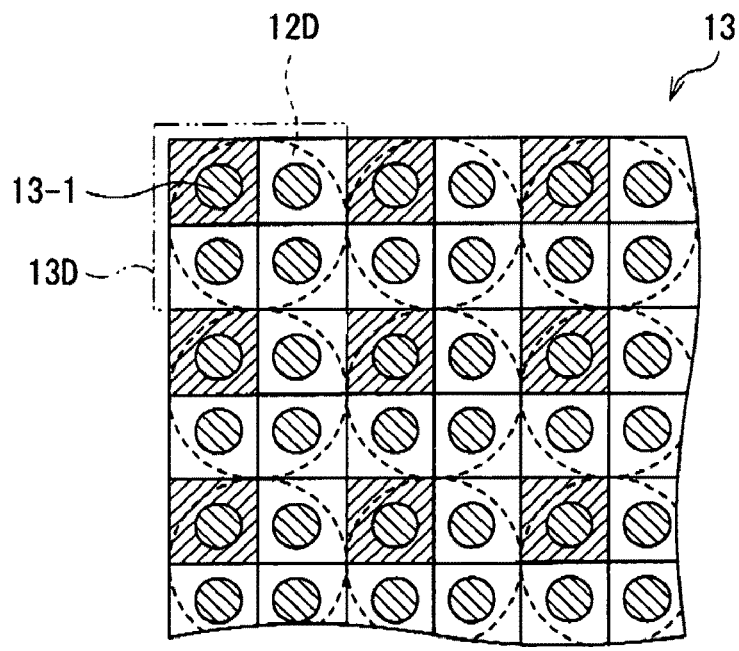
FIG. 11 is an illustration showing a pixel extracted from the light-sensing region shown in FIG. 10.
Figure 11:

Next, the functions and effects of the image pickup apparatus 1 according to the embodiment will be described below by referring to FIGS. 1 to 4, 10 and 11. FIG. 10 shows a light-sensing region in the image pickup device 13 in the embodiment; and FIG. 11 shows a state in which during image processing, a predetermined region is extracted from the light-sensing region shown in FIG. 10.

At first, the basic functions of the image pickup apparatus 1 will be described below referring to FIGS. 1 to 4. In the image pickup apparatus 1, an image of the object 2 by the image pickup lens 11 is formed on the microlens array 12. Then, an incident light ray to the microlens array 12 is received by the image pickup device 13 through the microlens array 12. At this time, the incident light ray to the microlens array 12 is received in a different position of the image pickup device 13 according to the incident direction of the incident light ray.

Figure 4:
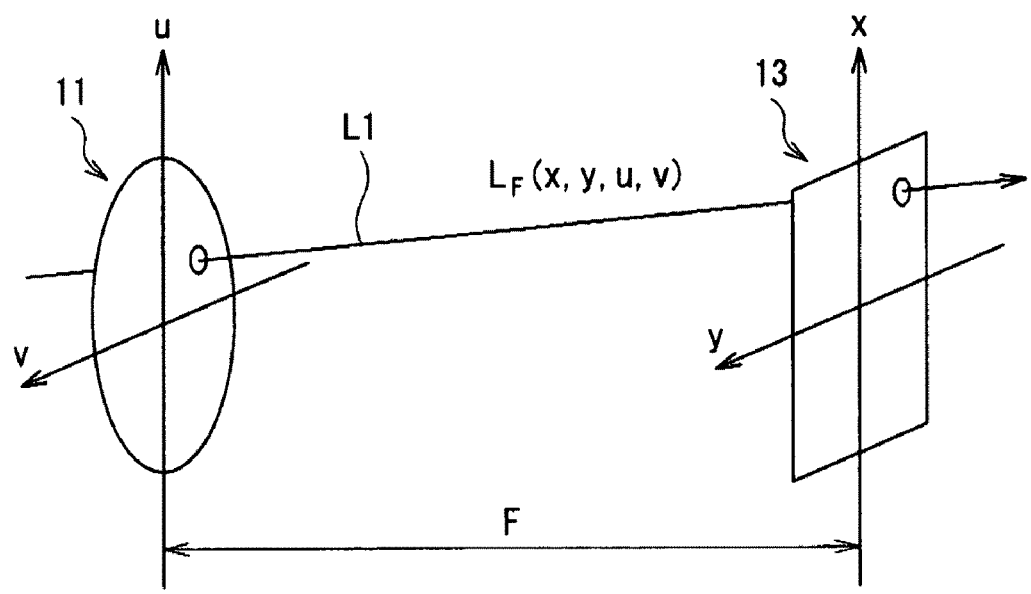
FIG. 4 is an illustration for describing information about a light ray entering into an image pickup device.

Here, light received by the image pickup device 13 will be described below by referring to FIG. 4. As shown in FIG. 4, assuming that a rectangular coordinate system (u, v) is defined on an image pickup lens plane of the image pickup lens 11, a rectangular coordinate system (x, y) is defined on an image pickup plane of the image pickup device 13, and a distance between the image pickup lens plane of the image pickup lens 11 and the image pickup plane of the image pickup device 13 is F, a light ray L1 passing through the image pickup lens 11 and the image pickup device 13, as shown in the drawing, is represented by a four-dimensional function $L_F(x, y, u, v)$, so the light ray L1 in a state in which, in addition to information about the position of the light ray, the traveling direction of the light ray is kept is stored in the image pickup device 13. In other words, the incident direction of the light ray is determined by the arrangement of a plurality of pixels associated with each microlens.

When light is received by the image pickup device 13 in such a manner, in response to the driving operation by the image pickup device driving section 15, an image pickup data is obtained from the image pickup device 13, and the image pickup data is inputted into the image processing section 14. The image processing section 14 performs predetermined image processing on the image pickup data in response to the control of the control section 16, and thereby the reproduced image is outputted according to the image pickup data Dout.

Figure 5:
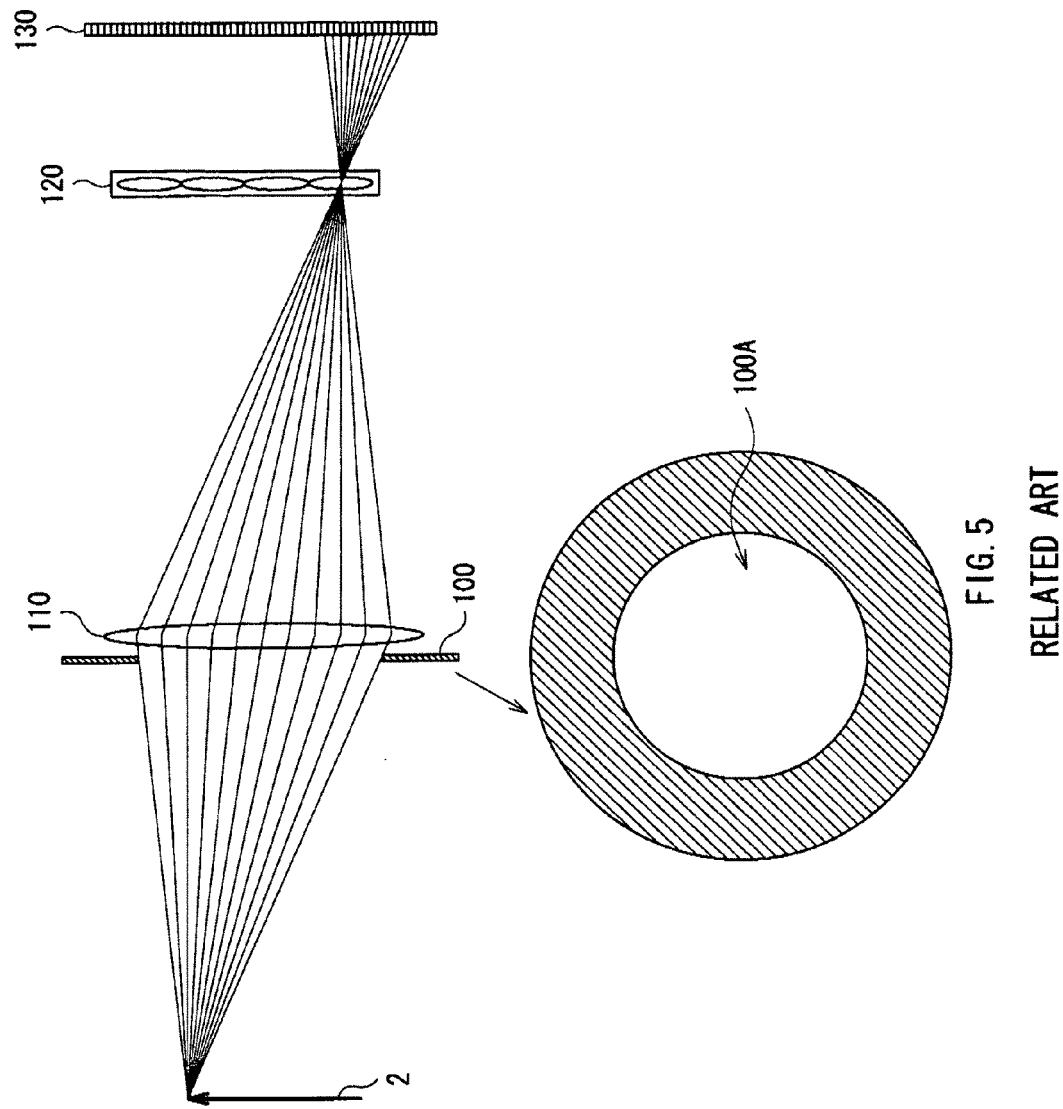
FIG. 5 is an illustration showing the whole configuration of an image pickup apparatus in a related art as a comparative example.
Figure 6:
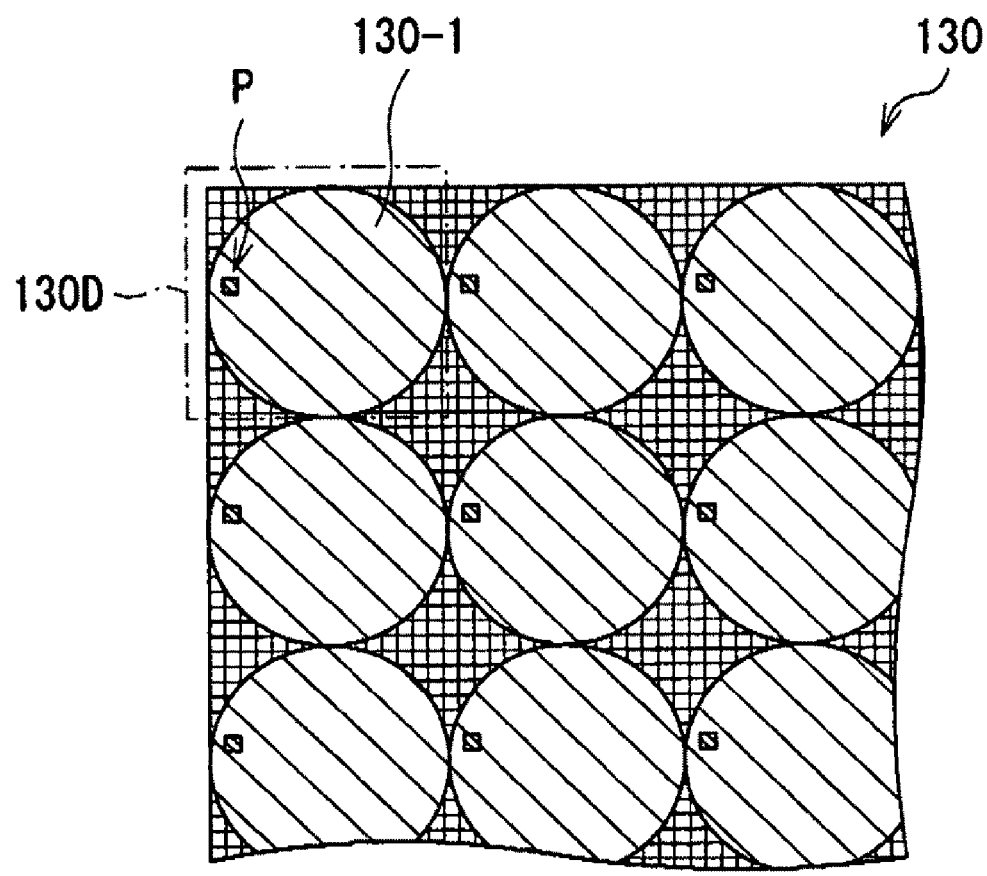
FIG. 6 is an illustration showing a light-sensing region on an image pickup device in the case where the image pickup apparatus shown in FIG. 5 is used.
Figure 7:
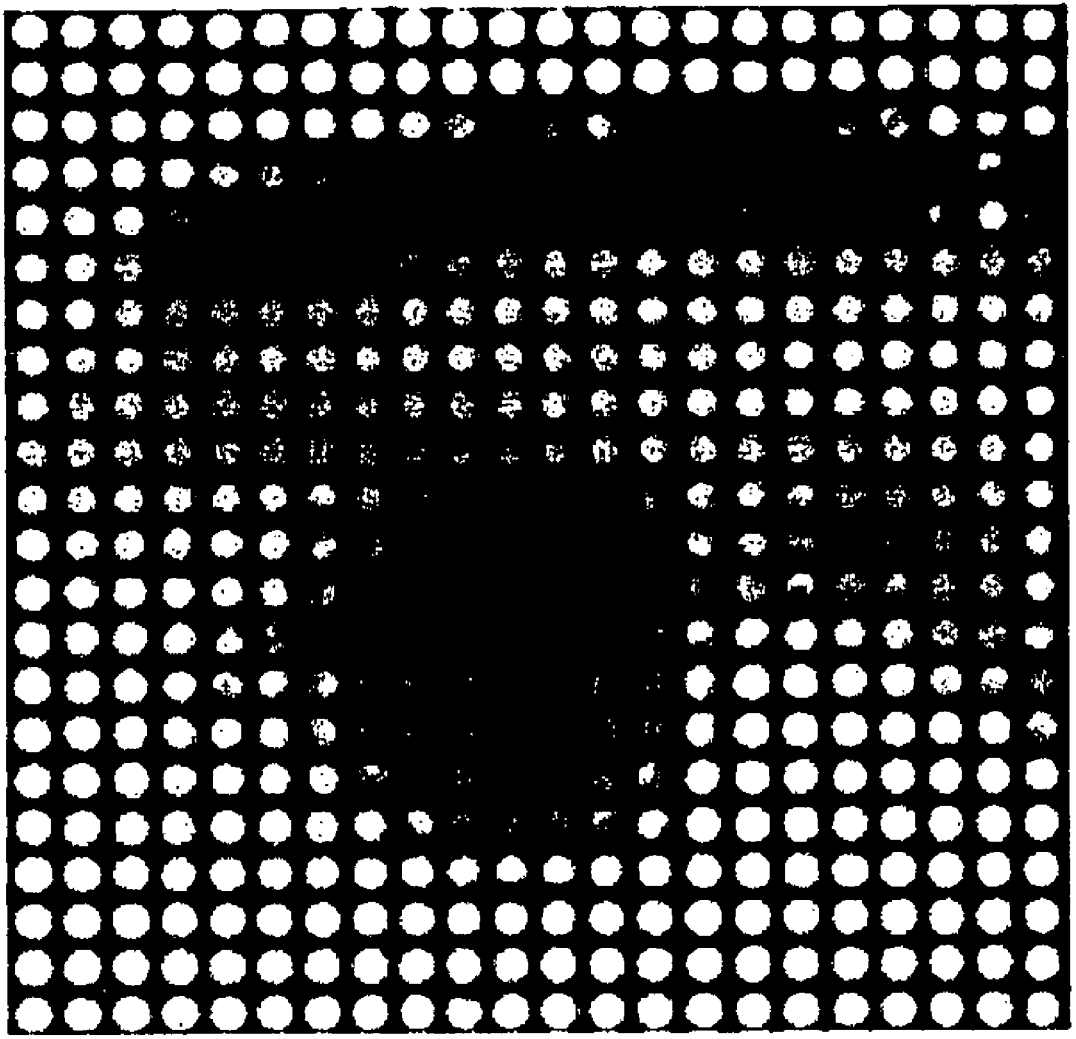
FIG. 7 is an image actually obtained by the image pickup apparatus shown in FIG. 5.
Figure 8:
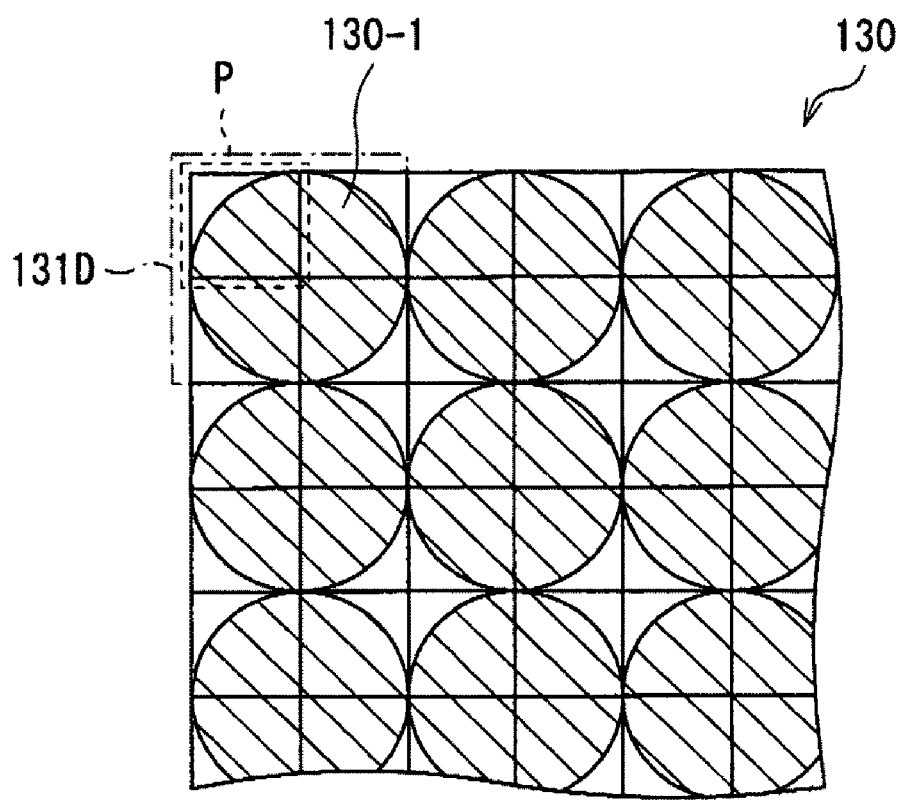
FIG. 8 is an illustration showing a light-sensing region in the comparative example.
Figure 9A:
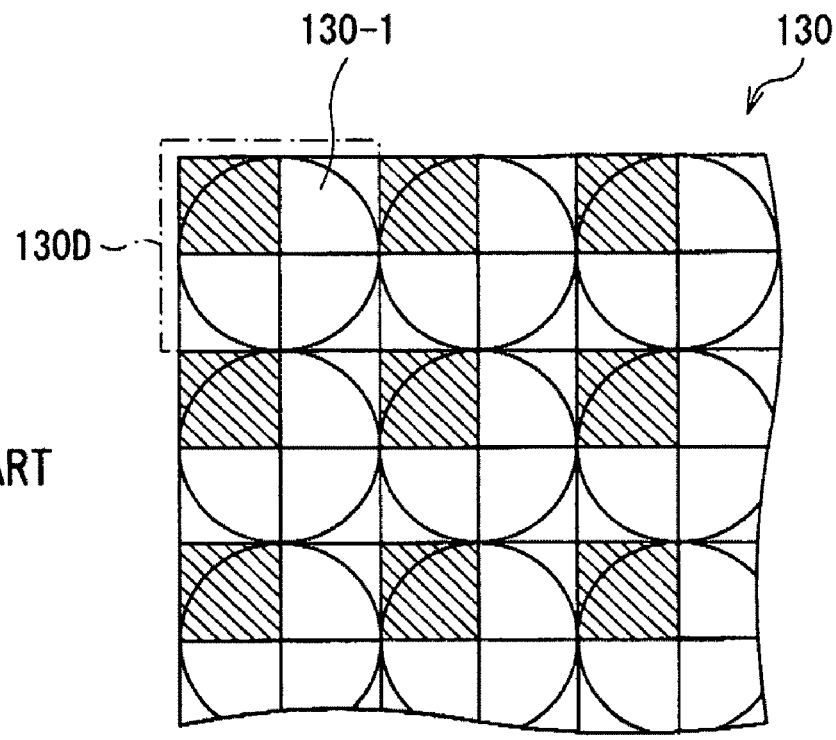
FIGS. 9A and 9B are illustrations showing a pixel extracted from the light-sensing region shown in FIG. 8.
Figure 9B:
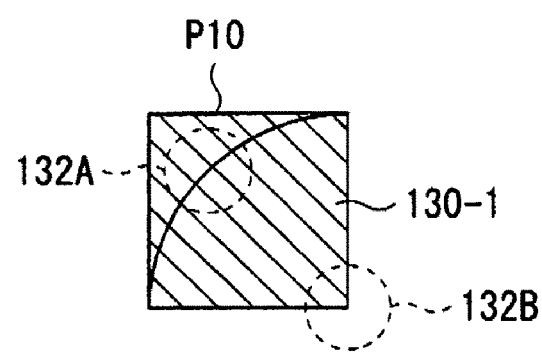

Next, characteristic functions of the image pickup apparatus 1 will be described by referring to FIGS. 10 and 11 in comparison with an image pickup apparatus in a related art shown in FIGS. 5 to 9A and 9B. FIG. 5 shows a schematic view of the image pickup apparatus using an aperture stop in the related art; FIG. 6 shows a light-sensing region of an image pickup device in the case where the image pickup apparatus shown in FIG. 5 is used; FIG. 7 shows an image actually obtained in the image pickup apparatus shown in FIG. 5; and FIGS. 8, 9A and 9B show a light-sensing region in the case where the number of pixels associated with each microlens is reduced through the use of the aperture stop in the related art.

As shown in FIG. 5, the image pickup apparatus in the related art includes an image pickup lens 110 including an aperture stop 100, a microlens array 120 and an image pickup device 130 in order from a side closer to the object 2, and the aperture stop 100 includes one circular aperture section 100A in its central part. Therefore, as described above, all light rays passing through the aperture stop 100A keep information about the traveling direction.

Therefore, in the configuration in the related art, as shown in FIG. 6, light is received in a light-sensing region 130-1 with a circular shape formed by projecting the circular shape of the aperture stop. Moreover, in the image pickup device 130, one microlens is associated with a region where 15×15=225 pixels P are arranged. Further, as described above, the incident direction of the light ray is determined by the positions of the pixels P associated with each microlens. Therefore, after the output of one pixel P where an image is formed in the same position is extracted in each microlens, the extracted outputs are combined. Thereby, for example, a reproduced image in one direction, as shown in FIG. 7, is obtained. A region (a reproduction pixel region 130D) where the pixels P associated with each microlens are arranged corresponds to one pixel of the reproduced image.

Therefore, in the case where the number of pixels of the image pickup device 13 is fixed, the smaller the number of pixels associated with each microlens is, the larger the number of pixels in the reproduced image becomes, and the higher the resolution becomes.

As shown in FIG. 8, the case where the number of microlenses is increased through the use of the aperture stop in the related art to set the number of pixels associated with each microlens to 2×2=4 will be considered. In this case, as shown in FIG. 9A, in an extracted pixel P10, its light-sensing region has the shape of a sector. At this time, as shown in FIG. 9B, the traveling directions of light rays received in a region 132A around an arc part and a region around an apex angle are different from each other. In the light-sensing region 130-1 of one extracted pixel P10, the dispersion of the traveling direction of a light ray received is increased, so it is difficult to obtain information about a light ray in a desired traveling direction. Therefore, in the case where an image is reproduced by combining the extracted pixels P10, when the number of pixels associated with each microlens is reduced, it becomes possible to increase the number of pixels in the reproduced image, but the image quality declines.

On the other hand, in the embodiment, the aperture stop 10 includes four aperture sections 10A rotation-symmetrically arranged with respect to each other, so as shown in FIG. 10, on the image pickup device 13, four light-sensing regions 13-1 corresponding to four aperture sections 10A are formed in a region where pixels associated with each microlens are arranged (the reproduction pixel region 13D). Moreover, the number of pixels P associated with each microlens is equal to the number of aperture sections 10A, that is, 4 (2×2).

In such a configuration, as shown in FIG. 11, in the light-sensing region 13-1 in one extracted pixel P1, compared to the light-sensing region 130-1 shown in FIGS. 9A and 9B, a luminous flux entering into the image pickup device 13 is narrowed, so only a light ray of which the traveling direction is limited passes through the aperture section 10A. Therefore, information about a light ray in a desired traveling direction in one extracted pixel P is obtained easily.

Moreover, a plurality of aperture sections 10A are arranged in a region on a circumference side of the aperture stop 10, so information about a light ray in a field of view having a larger angle with respect to a front direction is able to be obtained.

As described above, in the embodiment, when four aperture sections 10A are arranged in the aperture stop 10, the luminous flux entering into the image pickup device 13 is narrowed, and even in the case where the number of pixels associated with each microlens is reduced, information about a light ray in a desired direction in each pixel P is obtained easily. Therefore, without a decline in image quality, it becomes possible to increase the number of pixels in the reproduced image.

Figure 12A:
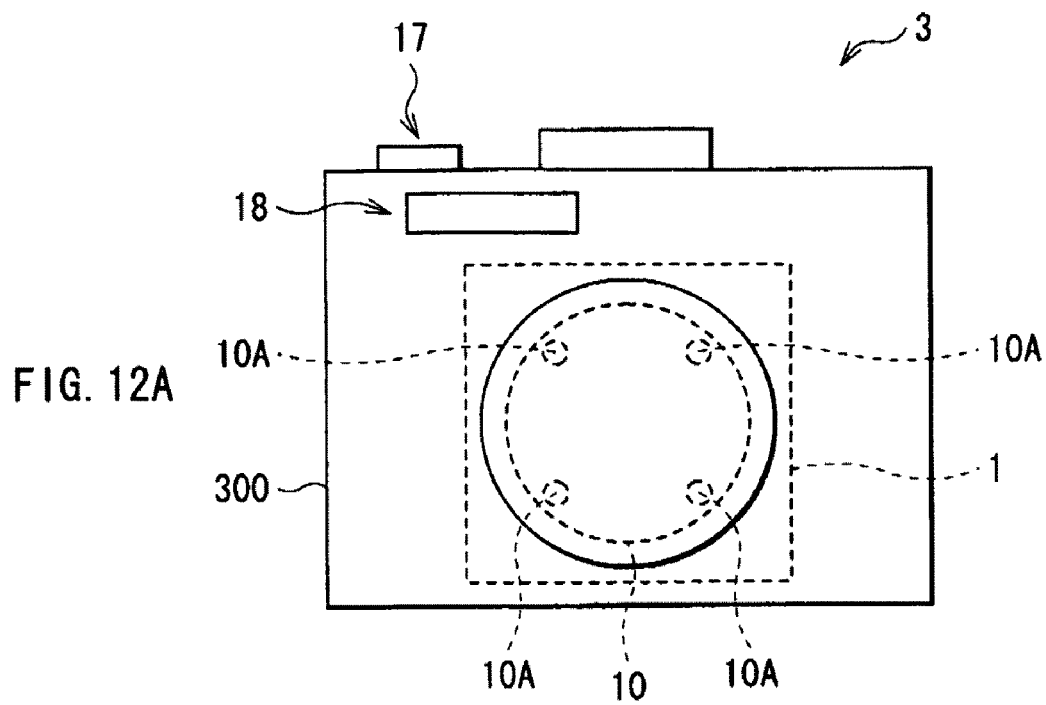
FIGS. 12A and 12B are illustrations showing an application example of the image pickup apparatus shown in FIG. 1.
Figure 12B:
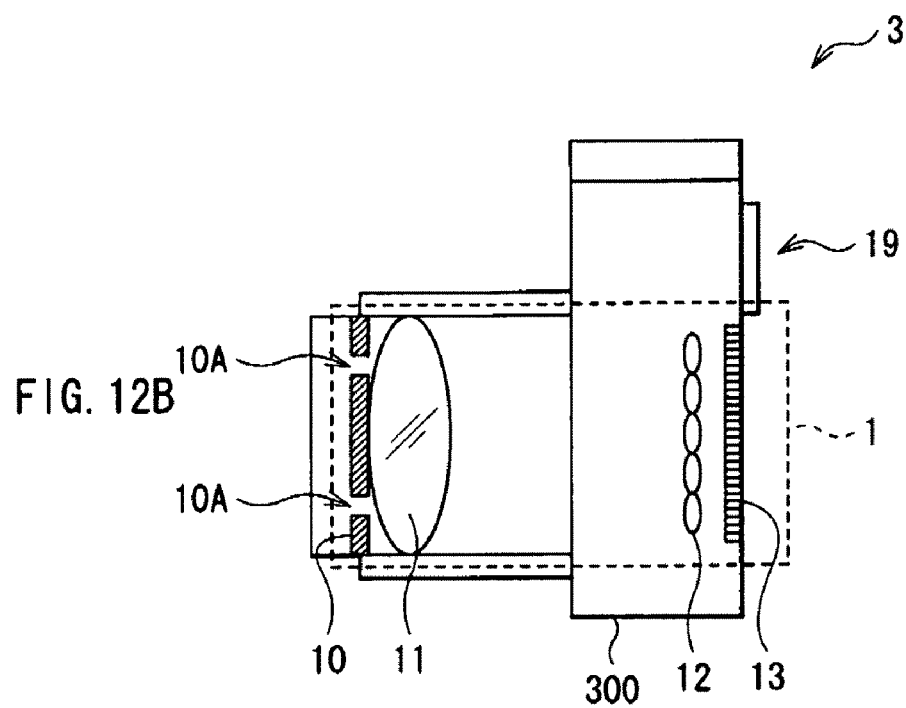

Moreover, the above-described image pickup apparatus 1 is applicable to a digital still camera 3 as shown in FIGS. 12A and 12B. FIGS. 12A and 12B show schematic views of the digital still camera 3, and FIG. 12A shows a front view and FIG. 12B shows a side view. The digital still camera 3 includes the image pickup apparatus 1 in an enclosure 300, and a shutter 17, a flash 18, a finder optical system 19 and the like are arranged on the enclosure 300. Further, the image pickup apparatus 1 is applicable to a position sensor, a biosensor, an optical microscope and the like in addition to such a camera.

Next, modifications of the invention will be described below.

Modification 1

Figure 13A:
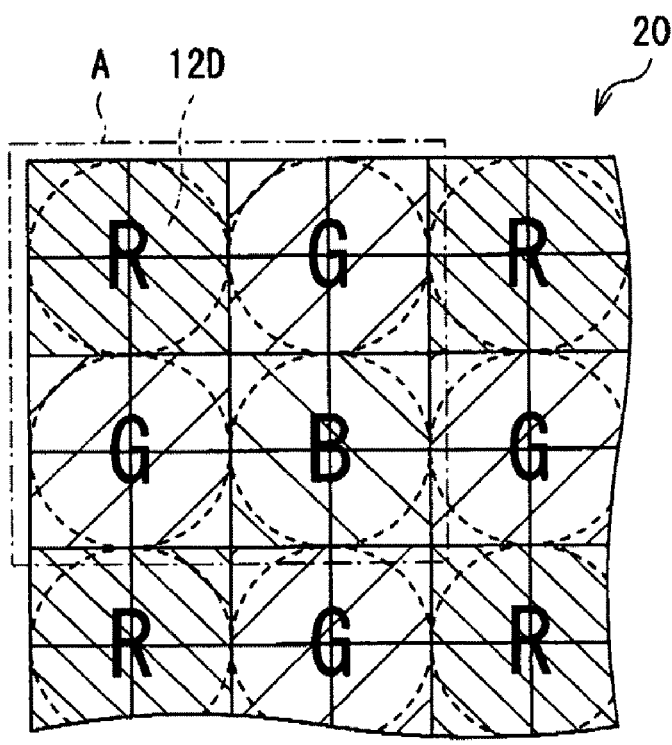
FIGS. 13A and 13B are illustrations showing the configuration of a color filter according to a modification 1.
Figure 13B:
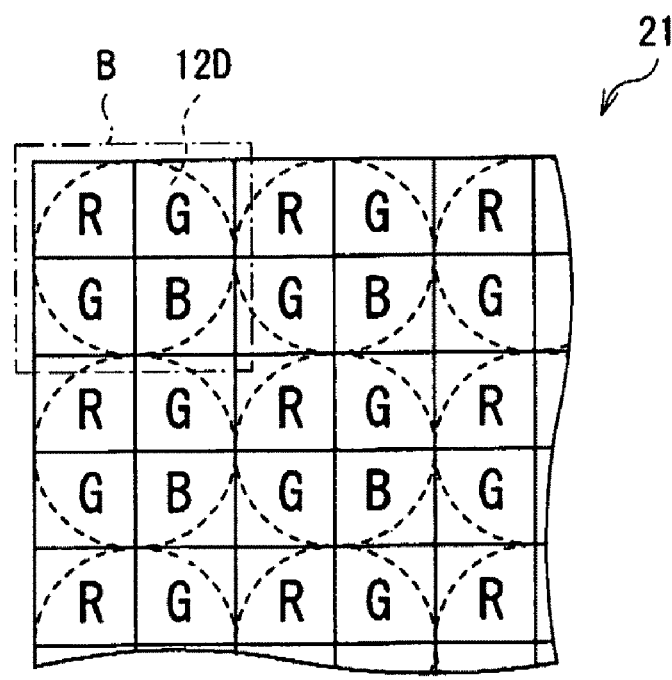

FIGS. 13A and 13B show plan views of color filters 20 and 21 according to a modification 1 of the invention. The color filters 20 and 21 each are arranged on a light-sensing plane of the image pickup device 13 to allow a picked-up color image to be displayed.

In FIG. 13A, the color filter 20 has a configuration in which each region 12D corresponding to a microlens, that is, each arrangement of 2×2 pixels, is color-coded. Moreover, as a color arrangement, a configuration (arrangement A) in which the ratio of three primary color filters, that is, filters of red (R), green (G) and blue (B), is 1:2:1, and filters of green are regularly arranged on the diagonal is able to be used. In FIG. 13B, the color filter 21 has a configuration in which each pixel P is color-coded, and the same color arrangement (arrangement B) as that of the above-described color filter 20 is used.

Thus, in the invention, when the color filter in which each predetermined pixel region is color-coded is arranged, it becomes possible to display a color image. At this time, in particular, as in the case of the color filter 20 shown in FIG. 13A, when each microlens-corresponding region 12D is color-coded, unlike FIG. 13B, in the case where a pixel arranged in the same position is extracted in each microlens to synthesize an image from extracted pixels, the same color arrangement is able to be established even after synthesizing an image. Therefore, compared to FIG. 13B, for example, processing, such as color interpolation, is easily performed.

Modification 2

Figure 14:
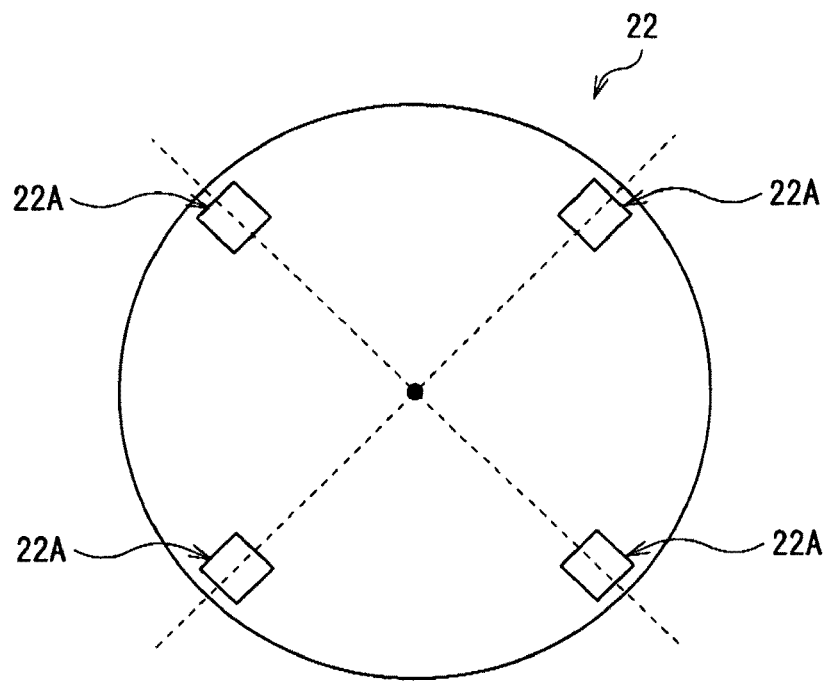
FIG. 14 is an illustration showing the configuration of an aperture stop according to a modification 2.

FIG. 14 shows a schematic plan view of an aperture stop 22 according to a modification 2 of the invention. The aperture stop 22 includes four rectangular aperture sections 22A. Moreover, the aperture sections 22A are rotation-symmetrically arranged with respect to each other on the circumference side of the aperture stop 22. As long as a plurality of aperture sections have the same shape, the shape of the aperture sections is not limited to the above-described circular shape and may have a polygonal shape.

Modification 3

Figure 15:
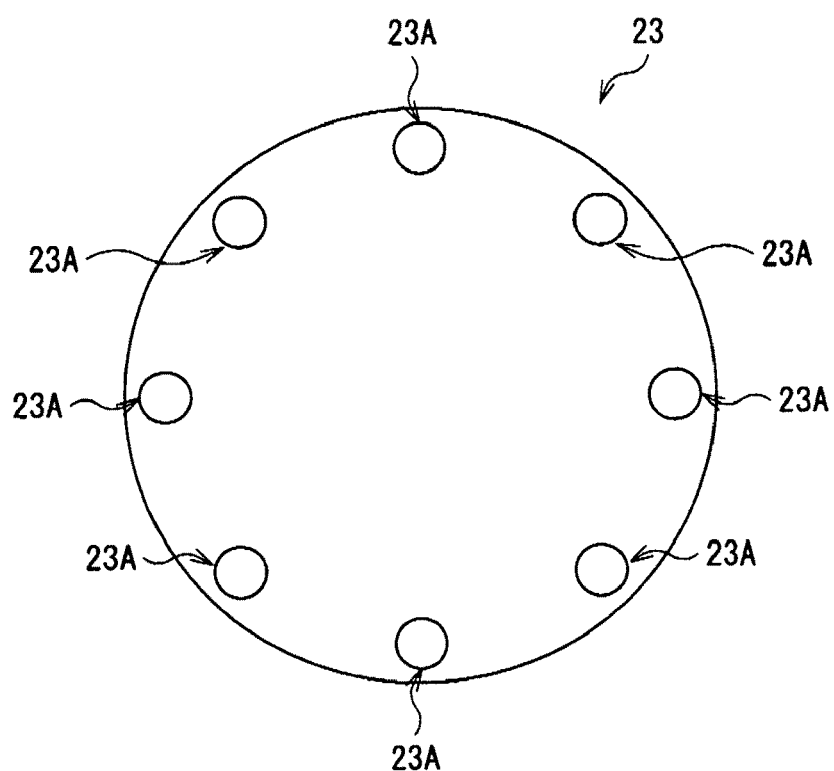
FIG. 15 is an illustration showing the configuration of an aperture stop according to a modification 3.
Figure 16:
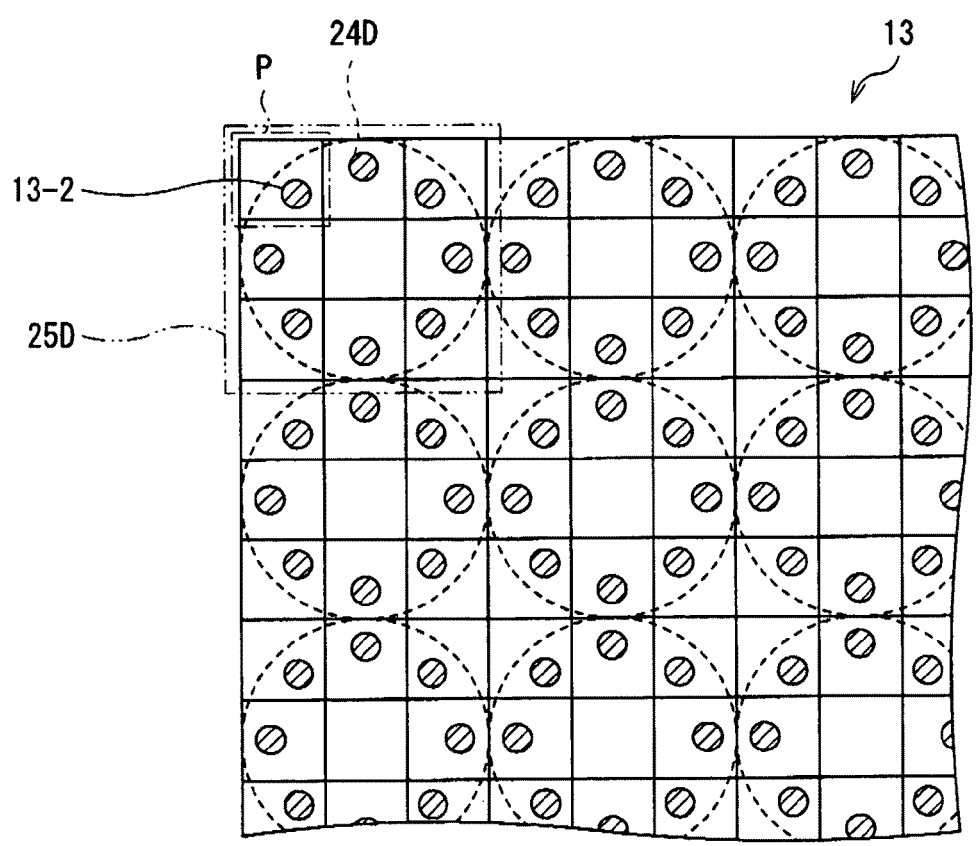
FIG. 16 is an illustration showing a light-sensing region on an image pickup device in the case where the aperture stop shown in FIG. 15 is used.
Figure 17A:
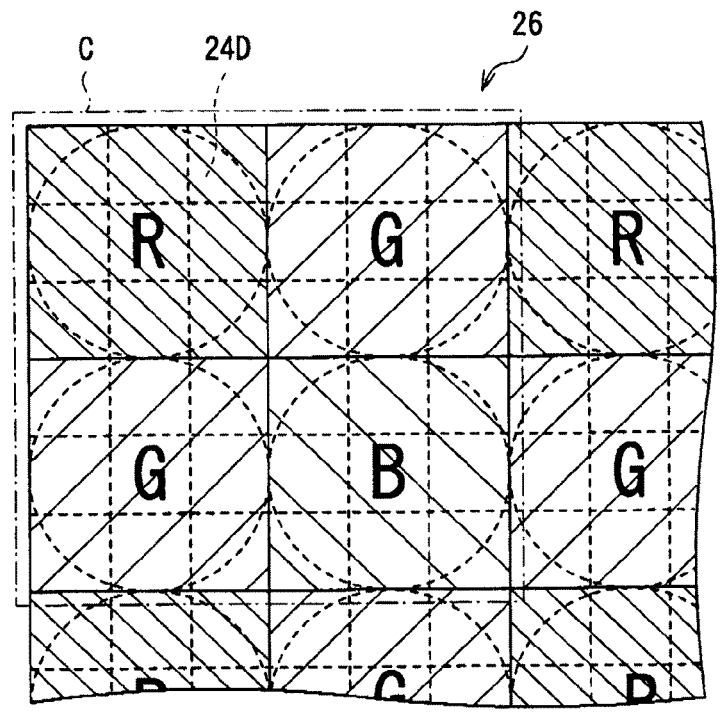
FIGS. 17A and 17B are illustrations showing the configuration of a color filter in the case where the aperture stop shown in FIG. 15 is used.
Figure 17B:
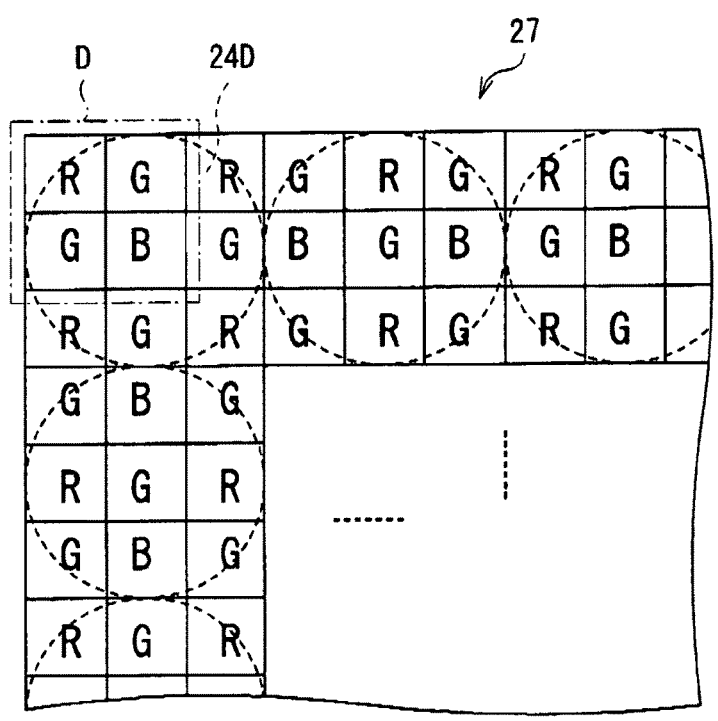

FIG. 15 shows a schematic plan view of an aperture stop 23 according to a modification 3 of the invention. Moreover, FIG. 16 shows a light-sensing region of an image pickup device in the case where the aperture stop 23 is used; and FIGS. 17A and 17B show the configuration of a color filter in the case where the aperture stop 23 is used. The aperture stop 23 includes 8 circular aperture sections 23A. Further, the aperture sections 23A are rotation-symmetrically arranged with respect to each other on the circumference side of the aperture stop 23. Thereby, as shown in FIG. 16, on the image pickup device 13, 8 light-sensing regions 13-2 corresponding to 8 aperture sections 23A are formed in a region where pixels P associated with each microlens are arranged (a reproduction pixel region 25D). Further, the number of pixels P associated with each microlens is 9 (3×3).

Moreover, in the case where a color image is displayed, as shown in FIG. 17A, a color filter 26 in which each arrangement of the pixels P associated with each microlens, that is, each pixel arrangement of 3×3 is color-coded, may be arranged, or as shown in FIG. 17B, a color filter 27 in which each pixel P is color-coded may be arranged. However, as shown in FIG. 17A, when the color filter 26 in which a region corresponding to each microlens is color-coded is used, unlike FIG. 17B, in the case where a pixel is extracted in each microlens to synthesize an image from extracted pixels, the same arrangement is able to be established even in an image after being synthesized, so compared to FIG. 17B, processing, such as color interpolation, is easily performed.

One more aperture section 23A may be arranged in the central part of the aperture stop 23 so that the number of aperture sections 23A is 9. In such a configuration, in addition to a light ray in an arbitrary field of view, a light ray traveling in a front direction is able to be obtained, so it becomes possible to reproduce an image in a front direction. Therefore, in the case where an image in a front direction is necessary depending on the application, aperture sections are preferably arranged not only on the circumference side but also in the central part.

Although the present invention is described by referring to the embodiment, the invention is not limited to the embodiment, and it may be modified variously. For example, in the above-described embodiment, the image processing section 14 is described as one component of the image pickup apparatus 1; however, the image processing section is not necessarily arranged in the image pickup apparatus. More specifically, the image processing section may be arranged in an apparatus other than the image pickup apparatus, for example, a PC (Personal Computer) or the like, and image pickup data obtained in the image pickup apparatus may be transferred to the PC to perform image processing on the image pickup data in the PC.

Moreover, in the above-described embodiment, the case where the number of the aperture sections in the aperture stop and the number of pixels associated with each microlens are equal to each other is described; however, the numbers are not necessarily equal to each other, and they may be different from each other.

Further, in the above-described embodiment, the aperture stop is arranged on a side closer to an object (an incident side) of the image pickup lens; however, the invention is not limited to this, and the aperture stop may be arranged on a side closer to an image (an emission side) of the image pickup lens or in the image pickup lens.

In the above-described embodiment, the color filters of red, green and blue are arranged at a ratio of 1:2:1, and the color filters of green are arranged on the diagonal; however, the invention is not limited to this case, and the color filters may be arranged at any other ratio, or any other arrangement of the color filters may be used.

It should be understood by those skilled in the art that various modifications, combinations, subcombinations and alterations may occur depending on design requirements and other factors insofar as they are within the scope of the appended claims or the equivalents thereof.

What is claimed is:

1. An image pickup apparatus comprising:
an image pickup lens section including an aperture stop, the aperture stop including a plurality of aperture sections;

an image pickup device obtaining image pickup data on the basis of light received; and a microlens array section being arranged on the focal plane of the image pickup lens section between the image pickup lens and the image pickup device, and including one microlens for a plurality of pixels of the image pickup device;

wherein the number of the aperture section is equal to the number of pixels associated with each microlens in the image pickup device.

2. The image pickup apparatus according to claim 1, comprising:

an image processing section for performing predetermined image processing on image pickup data obtained by the image pickup device.

3. The image pickup apparatus according to claim 2, wherein after the image processing section extracts pixel data in the same position in each pixel region corresponding to each microlens from the image pickup data, the image processing section synthesizes a reproduced image from the extracted pixel data.

4. The image pickup apparatus according to claim 1, wherein the aperture stop has a circular shape, and the plurality of aperture sections are arranged along the circumference of the aperture stop.

5. The image pickup apparatus according to claim 1, wherein the plurality of aperture sections are rotation-symmetrically arranged with respect to each other about the center point of the aperture stop.

6. The image pickup apparatus according to claim 1, comprising:

a color filter on a light-sensing plane of the image pickup device, the color filter in which each pixel region corresponding to each microlens is color-coded.

7. The image pickup apparatus according to claim 1, wherein the plurality of aperture sections are coplanar.

8. The image pickup apparatus according to claim 1, wherein the plurality of aperture sections are arranged around an outer portion of the aperture stop.

9. The image pickup apparatus according to claim 1, wherein the image pickup device is configured to the obtain image pickup data on the basis of light received through each aperture of the plurality of aperture sections.

10. The image pickup apparatus according to claim 1, wherein the image pickup lens section narrows a luminous flux incident on the image pickup lens section concurrently with each aperture of the plurality of aperture sections.

11. The image pickup apparatus according to claim 1, wherein the plurality of aperture sections include a first aperture section and a second aperture section, the plurality of pixels includes a first pixel and a second pixel, and the first pixel is configured to receive light corresponding to the first aperture section and second pixel is configured to receive light corresponding to the second aperture section.

12. The image pickup apparatus according to claim 11, wherein the first pixel is configured to receive the light corresponding to the first aperture section concurrently with the second pixel receiving the light corresponding to the second aperture section.

* * * * *